(12) United States Patent
Federmann et al.

(10) Patent No.: US 8,496,103 B2
(45) Date of Patent: Jul. 30, 2013

(54) CONVEYING APPARATUS

(75) Inventors: Andreas Federmann, Stuttgart (DE); Michael Lauer, Stuttgart (DE)

(73) Assignee: Duerr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/543,463

(22) Filed: Jul. 6, 2012

(65) Prior Publication Data

US 2012/0273326 A1     Nov. 1, 2012

Related U.S. Application Data

(63) Continuation of application No. PCT/EP2010/069902, filed on Dec. 16, 2010.

(30) Foreign Application Priority Data

Jan. 11, 2010    (DE) .......................... 10 2010 000 790

(51) Int. Cl.
*B65G 35/06*      (2006.01)
*B61B 13/00*      (2006.01)

(52) U.S. Cl.
USPC ........................ 198/465.3; 104/171

(58) Field of Classification Search
USPC ............... 198/465.3, 803.2, 867.14; 104/168, 104/171
See application file for complete search history.

(56) References Cited

U.S. PATENT DOCUMENTS

| | | | | |
|---|---|---|---|---|
| 4,438,701 A | * | 3/1984 | Murai et al. | ............... 104/172.3 |
| 4,548,135 A | * | 10/1985 | Kupczyk | ........................ 104/135 |
| 5,014,625 A | * | 5/1991 | Murai et al. | .................. 104/292 |
| 5,934,186 A | * | 8/1999 | Alberga et al. | ................. 99/489 |
| 6,360,671 B1 | * | 3/2002 | Nakagami | ...................... 104/168 |
| 6,398,005 B1 | | 6/2002 | Patrito | |
| 6,415,721 B1 | | 7/2002 | Morikiyo et al. | |

(Continued)

FOREIGN PATENT DOCUMENTS

| | | |
|---|---|---|
| DE | 199 50 202 A1 | 5/2001 |
| DE | 100 18 122 A1 | 10/2001 |
| EP | 1 510 477 A1 | 3/2005 |

OTHER PUBLICATIONS

International Search Report dated Apr. 7, 2011 of international application PCT/EP 2010/069902 on which this application is based.

(Continued)

*Primary Examiner* — Douglas Hess
(74) *Attorney, Agent, or Firm* — Walter Ottesen P.A.

(57) ABSTRACT

A conveying apparatus (1) moves a transport unit (3) having at least one running section (4, 5). The running section (4, 5) can, in particular, be configured as a runner of a skid. The conveying apparatus (1) has a support (6, 8) which takes up the weight of the transport unit (3) on the running section (4, 5). The conveying apparatus (1) includes at least one drive roller (20) which interacts with the running section (4, 5) of the transport unit (3) for a rolling movement and subjects the transport unit (3) to a force ($F_K$) for movement along the support (6, 8). The drive roller (20) is operatively connected to a force-generating device (44) for providing a press-on force ($F_P$) pressing the drive roller (20) against the running section (4, 5) of the transport unit (3).

16 Claims, 5 Drawing Sheets

U.S. PATENT DOCUMENTS

| | | | |
|---|---|---|---|
| 6,494,142 B2 * | 12/2002 | Masugaki et al. | 104/168 |
| 6,568,525 B2 * | 5/2003 | Stone et al. | 198/803.2 |
| 7,127,997 B2 * | 10/2006 | Nishihara et al. | 104/89 |
| 7,556,139 B2 * | 7/2009 | Tsuruya et al. | 198/465.4 |
| 7,658,275 B2 * | 2/2010 | Hayashi | 198/459.8 |
| 7,721,871 B2 * | 5/2010 | Takano et al. | 198/346.2 |
| 2006/0162608 A1 | 7/2006 | Dibble | |

OTHER PUBLICATIONS

English translation of International Preliminary Report on Patentability of the international searching authority dated Aug. 9, 2012 in international patent application PCT/EP2010/069902 on which the claim of priority is based.

* cited by examiner

CONVEYING APPARATUS

CROSS REFERENCE TO RELATED APPLICATIONS

This application is a continuation application of international patent application PCT/EP 2010/069902, filed Dec. 16, 2010, designating the United States and claiming priority from German application 10 2010 000 790.0, filed Jan. 11, 2010, and the entire content of both applications is incorporated herein by reference.

FIELD OF THE INVENTION

The invention relates to a conveying apparatus for a transport unit having at least one running section, in particular a transport unit with a runner, for example a skid, with at least one support taking up the weight of the transport unit on the running section, and with at least one drive roller which interacts with the running section of the transport unit for a rolling movement and subjects the transport unit to force for movement along the support.

BACKGROUND OF THE INVENTION

A conveying apparatus of this type is known from DE 199 50 202 A1. Conveying apparatuses of this type are used in industrial production systems, in particular in painting or cleaning systems. With the conveying apparatuses, transport units with production articles, for example baskets or else frames or housings, in particular skids, on which the production articles are accommodated, can be moved through a system. The transport units are displaced here on a multiplicity of rollers. The rollers are at least partially configured as drive rollers. The drive rollers are moved by motor. In the process, they transmit force to a transport unit by means of friction. The force acts as a conveying force. A transport unit is therefore moved in the conveying apparatus. For the movement of transport units, known conveying apparatuses contain a large number of drive rollers which are accommodated on a shaft with a drive.

SUMMARY OF THE INVENTION

It is the object of the invention to provide a conveying apparatus which permits the reliable conveying of transport units, in particular with a reduced number of drive rollers.

This object is achieved by a conveying apparatus of the type mentioned above in which a drive roller is operatively connected to a force-generating means for providing and/or generating a press-on force $F_P$ for pressing the drive roller on the running section of the transport unit.

With the conveying apparatus according to the invention, in particular, known transport units which are in widespread use on conventional conveying apparatuses in industrial production systems can be moved. Such transport units do not require modification or only need to be retrofitted to a small extent for use in a conveying apparatus according to the invention.

In order to ensure reliable transport of heavy and spatially expanded transport units in conveying apparatuses with rollers, it has to be ensured that the drive rollers transmit conveying force to a transport unit as far as possible without slipping. However, in the abovementioned conveying apparatuses, the conveying force $F_K$, which can be transmitted by means of a drive roller, is dependent on the weight with which the transport unit rests on the drive roller in the running section.

The invention is based on the concept that the number of drive rollers in a conveying apparatus for transport units can be reduced if the conveying force $F_K$ which can be transmitted to a transport unit by means of a drive roller is not determined, or at least not solely determined, by the weight of the transport unit. For this purpose, the invention proposes a drive roller—in particular with an axis of rotation which is displaceable relative to the support—which bears with a press-on force $F_P$ on the running section of the transport unit. In order to bring about a press-on force $F_P$ which is independent of the weight of the transport unit, the drive roller is assigned a force-generating means for providing a press-on force. The force-generating means preferably comprises an adjustment device which permits defined adjustment of the press-on force $F_P$ with which a drive roller bears against a running section of the transport unit. In particular, the force-generating means may include a hydraulic, pneumatic or mechanical accumulator for potential energy. As an alternative, a variable press-on force can be generated via an electromagnetic actuating apparatus and can be introduced more or less directly into the drive roller. Furthermore, the invention is based on the concept of separating the driving function and supporting function and, in particular, of assigning different rollers in order to be able better to adapt the different rollers to the particular function. In particular, it is preferred to arrange supporting rollers either on the support or on the transport unit independently of the positioning of drive rollers. Conversely, it is possible to arrange at least one drive roller together with the force-generating unit on the transport unit independently of the positioning of the supporting rollers such that a transport unit can move along the support virtually autonomously. According to the invention, provision is furthermore made to arrange at least one drive roller with an associated force-generating unit on the support—this in turn takes place independently of a positioning of the supporting rollers.

In an advantageous embodiment of the invention, a drive roller (fitted on the support side) acts on a lateral surface of the running section of the transport unit. It then bears with a press-on force $F_P$ on a side surface of the running section. For this purpose, the drive roller is preferably provided with an axis of rotation displaceable relative to the support, and is mounted rotatably on an effective lever arm which can be acted upon with the force-generating device. The lever arm can be pivoted about a pivot axis. With the pivot axis and the perpendicular projection of the lever arm to the conveying direction of the transport unit, a plane, which is oriented vertically, can then be set up. With this measure, frictional forces on supporting rollers for the running section of the transport unit, which supporting rollers are arranged on a support of the conveying apparatus, can be minimized.

In order to ensure reliable guidance of the running section of the transport unit in the conveying apparatus, it is advantageous to generate the press-on force $F_P$ for the drive roller by means of a running roller supported on the lever arm via a (preferably hydraulic, pneumatic or mechanical) spring means. The running roller can roll, for example, on a lateral surface of the running section, which surface lies opposite that side surface on which the drive roller acts.

In a further preferred embodiment of the invention, the drive roller is mounted on a pivotable lever arm, the pivot axis of which together with the conveying direction for a transport unit in the conveying apparatus sets up a horizontally oriented plane or a plane inclined about the pivot axis of the lever arm with respect to a horizontal plane. The force-generating device, here, generates a press-on force for the drive roller on a surface of the running section of the transport unit, which surface faces the support, or on a surface thereof which faces away from the support.

For the generation of the press-on force $F_P$, a spring means which is supported on the support and acts on the lever arm is in particular advantageous here. The drive roller is preferably assigned a drive unit which is arranged displaceably with the axis of rotation of the drive roller and includes a motor. This permits simple driving of the drive roller without a complicated mechanism with cardan joints being required.

In the conveying apparatus, one or more rotatably mounted supporting rollers can be arranged on the support receiving the running section of a transport unit. Extremely quiet running of the transport units moved in the conveying apparatus can be achieved by the supporting rollers, which are arranged with drive rollers on a support, when the supporting rollers are configured as flanged rollers.

In the conveying apparatus, there are preferably at least two supports for receiving a transport unit, which has two running sections and is designed in particular as a skid, the supports supporting the weight of the transport unit on the running sections. The conveying apparatus may in particular include a multiplicity of drive rollers which are arranged at a support and each have an axis of rotation which is displaceable relative to one of the supports. In this case, each drive roller is assigned a force-generating device which brings about a press-on force $F_P$ for the drive roller on the corresponding running section of the transport unit, which is moved on the supports.

The conveying apparatus according to the invention is suitable in particular for transporting skids containing motor vehicle bodies in a painting system or transport baskets of an industrial cleaning system. It has been shown that a conveying apparatus according to the invention permits the movement of skids which have a length of between 3.5 m and 7 m, wherein a drive roller is provided merely every 3 to 6.5 m along the support in the conveying apparatus. By contrast, in conventional transport apparatuses, a skid of this length is reliably moved by the distance of consecutive drive rollers in the transport apparatus being selected to be not greater than 3 m. The invention furthermore provides skids on which drive rollers with an associated driving unit and a force-generating device are mounted, wherein the drive rollers can roll on a section of a support.

By means of the provision, along the support of the conveying apparatus, of position detectors which, for the detecting of the position of a transport unit, are connected to a control device for controlling the drives of the drive rollers, it is possible to move a multiplicity of transport units simultaneously automatically and in a controlled manner through the conveying apparatus. In order to permit the movement of a transport unit in a further conveying direction, it is advantageous to accommodate the at least one support in the conveying apparatus on an additional linear movement unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
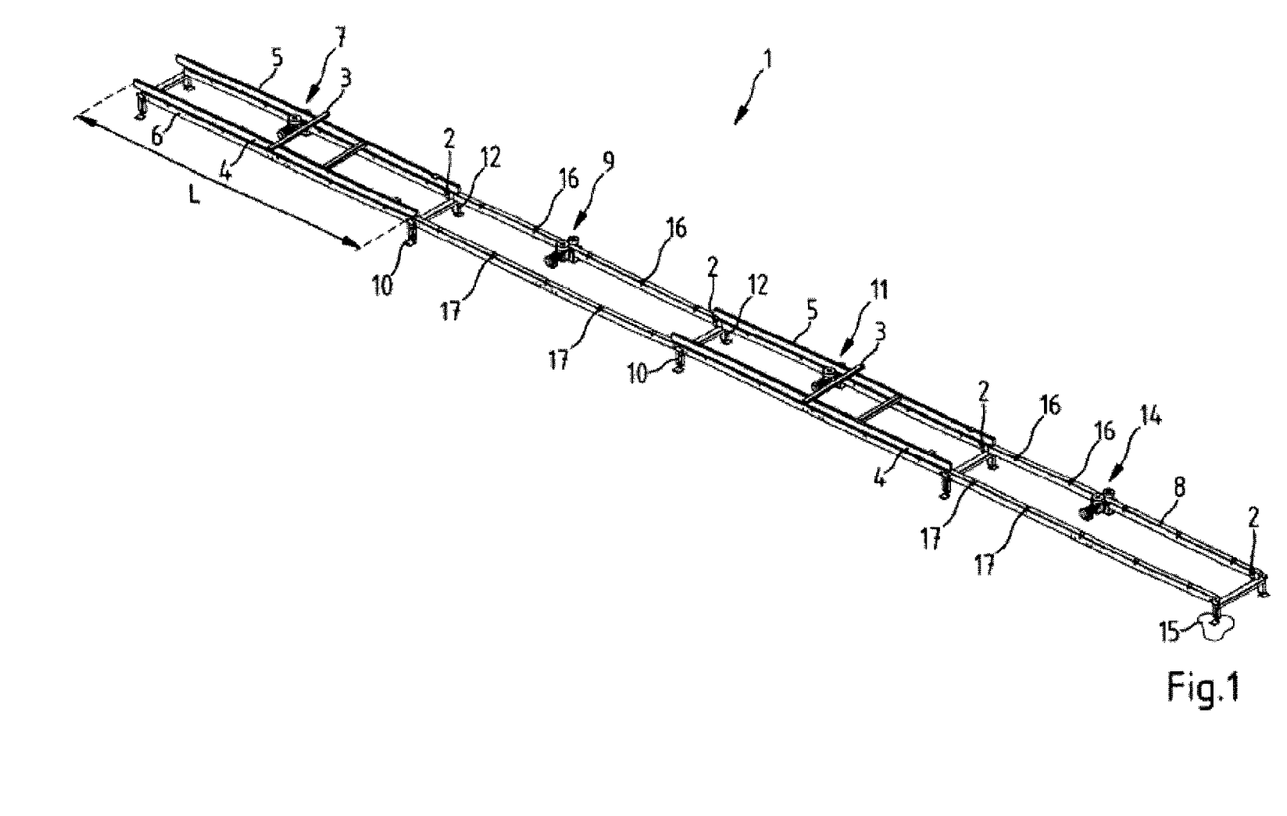
FIG. 1 shows a first conveying apparatus for a transport unit configured as a skid.

The conveying apparatus 1, which is shown in FIG. 1, is what is referred to as a roller conveyor. It is suitable, in particular, for transporting vehicle bodies in a painting system. The conveying apparatus 1 includes a first support 6 and a second support 8. A skid 3, which is configured for accommodating motor vehicle bodies, can move along the supports (6, 8). For this purpose, the skid 3 has running sections in the form of runners (4, 5).

Supporting rollers (16, 17), which are mounted rotatably at a distance of 0.5 m to 2 m, are arranged on the supports (6, 8). The weight of the skid 3 is first introduced, preferably via the runners (4, 5) of the skid, into the supporting rollers (16, 17) and from there into the supports (6, 8). The supports (6, 8) rest on posts (10, 12). The posts (10, 12) are fixed on a floor 15 by means of a pedestal.

In order to move the skid 3, the conveying apparatus 1 contains a multiplicity of driving units (7, 9, 11, 14). For the automatic control of the movement of a multiplicity of skids 3 in the conveying apparatus 1, there are position detectors 2 which are arranged along the support 8.

The skid 3 has a length L which preferably lies between L=3.5 m and L=7 m. The skid is constructed from steel supports with a rectangular profile. The rectangular profile of the steel supports preferably has a width b=5 cm and height h=10 cm. Skids with these dimensions are in widespread use as transport units in conveying apparatuses for chassis, vehicle parts and vehicles in automobile production. In automobile production, skids of this type form a virtual standard for transport units which can be moved with various conveying apparatuses.

Figure 2:
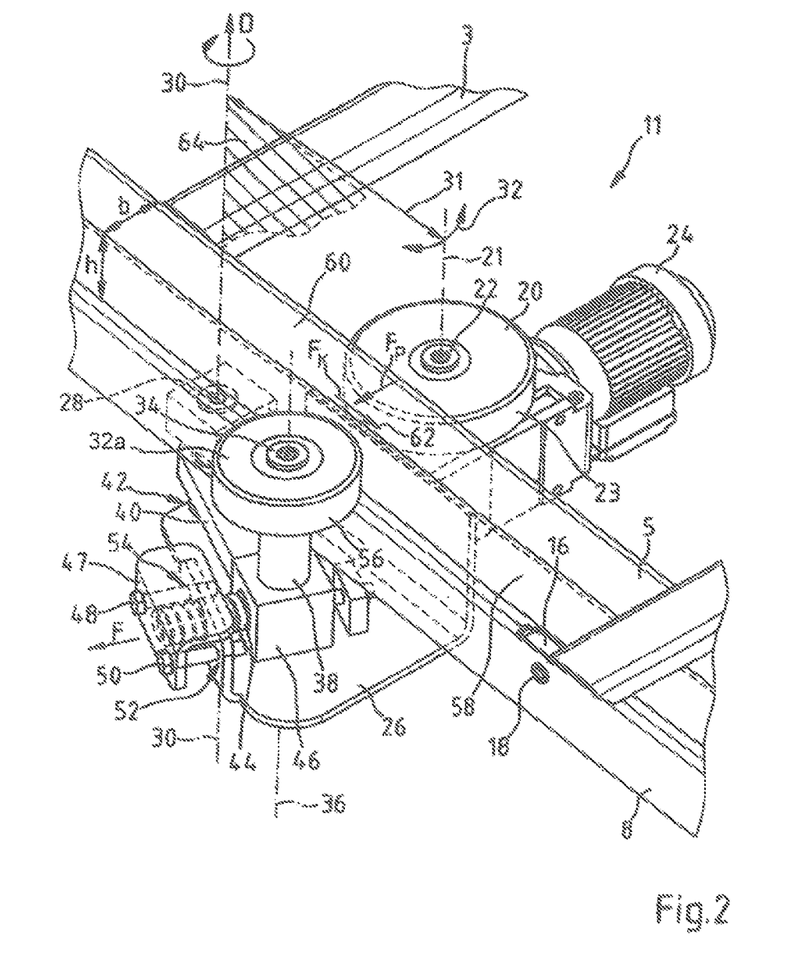
FIG. 2 shows a detailed view of the first conveying apparatus with a drive roller.

FIG. 2 shows a section of the conveying apparatus 1 with the driving unit 11. The runner 5 is guided on the support 8 by supporting rollers 16. A supporting roller 16 is mounted rotatably on a shaft 18 on the support 8. In order to ensure reliable guidance of the runner 5 of the skid 3 on the support 8, the supporting rollers 16 arranged on the support 8 have a flanged roller geometry.

The driving unit 11 includes a drive roller 20. The drive roller 20 is mounted rotatably in a rotary bearing 22. The drive roller 20 can be rotated in the rotary bearing 22 about the axis of rotation 21. The drive roller 20 has a roller surface 23 which bears against the lateral surface 60 of the runner 5 of the skid 3. The roller circumferential surface 23 or the entire drive roller 20 is preferably entirely or partially manufactured from an elastomer plastic, in particular a polyurethane (PUR) or an EPDM rubber. In a modified exemplary embodiment, the roller circumferential surface 23 has a coating or tires made of an elastomeric plastic.

The drive roller 20 is assigned an electric motor 24 as the drive. The electric motor 24 has a "heavy fan wheel" with a large inert mass. This ensures that the conveying apparatus can be operated by electric motors in the on/off mode without a complicated electronic control unit being required for a gentle, constant in-running and out-running behavior of the electric motor, in order to avoid jerky movements.

The electric motor 24 and the drive roller 20 are accommodated on a pivotable holding unit 26. The pivotable holding unit 26 is held on the support 8 by a rotary joint 28. The pivotable holding unit 26 can be pivoted about a pivot axis 30 in the rotary joint 28. By means of the holding unit 26, an effective pivotable lever arm 31 is formed for the rotary bearing 22 with the drive roller 20. The drive roller 20 can thus be moved with the effective lever arm 31 about the axis 30 relative to the support 8 in a manner corresponding to the double arrow 32.

The drive roller 20 is combined with a running roller 32*a*. The running roller 32*a* particularly preferably has a roller surface 56 which is coated with an elastomeric plastic (for example PUR). The running roller 32*a* is accommodated on a rotary bearing 34 which has an axis of rotation 36. The rotary bearing 34 is connected to a lever arm 40 via the holding section 38. This lever arm 40 is held in a pivot bearing 42 which has a pivot axis corresponding to the axis 30.

A spring unit 44 is fixed in a spring receptacle 46 on the lever arm 40. The spring unit 44 may also be pretensioned. The spring unit 44 is accommodated on the holding unit 26 in an adjustment section 47 acting as an adjustment device. The adjustment section 47 includes two adjusting screws (48, 50). The adjusting screws (48, 50) engage in threads (52, 54) on the holding unit 26.

The running roller 32*a* bears against the side surface 58 of the runner 5. It is pressed against the side surface 58 by the spring unit 44. In the process, the pivotable holding unit 26 is subjected to the force F. This force generates the torque D in the axis 30. The torque D acts on the drive roller 20 via the effective lever arm 31. It generates a press-on force $F_P$ for pressing the drive roller 20 against the side surface 60 of the runner 5. By adjustment of the adjusting screws (48, 50) for the spring unit 44, it is possible to adjust the magnitude of the press-on force Fp for the drive roller 20.

Owing to the static friction between the roller surface 23 of the drive roller 20 and the side surface 60 of the runner 5, a conveying force $F_K$ acting in the direction of the arrow 62 is introduced into the runner 5 by means of the drive roller 20. The direction 62 of the conveying force $F_K$ corresponds to the conveying direction of the skid 3 in the transport apparatus 1. The magnitude of the conveying force $F_K$ is determined by the press-on force $F_P$ of the drive roller 20 against the side surface 60 of the runner 5 and the coefficient of friction for the frictional force between the roller surface 23 and the side surface 60. In this case, the perpendicular projection of the lever arm 31 to the conveying direction 62 with the pivot axis 30 sets up a vertically oriented plane 64. This measure ensures that, in the case of the supporting rollers 16, the press-on force $F_P$ causes no or only small forces which have a force component parallel to the weight and which would cause additional undesirable friction in the bearings for the supporting rollers 16 and would bring about unnecessary wear.

Figure 3:
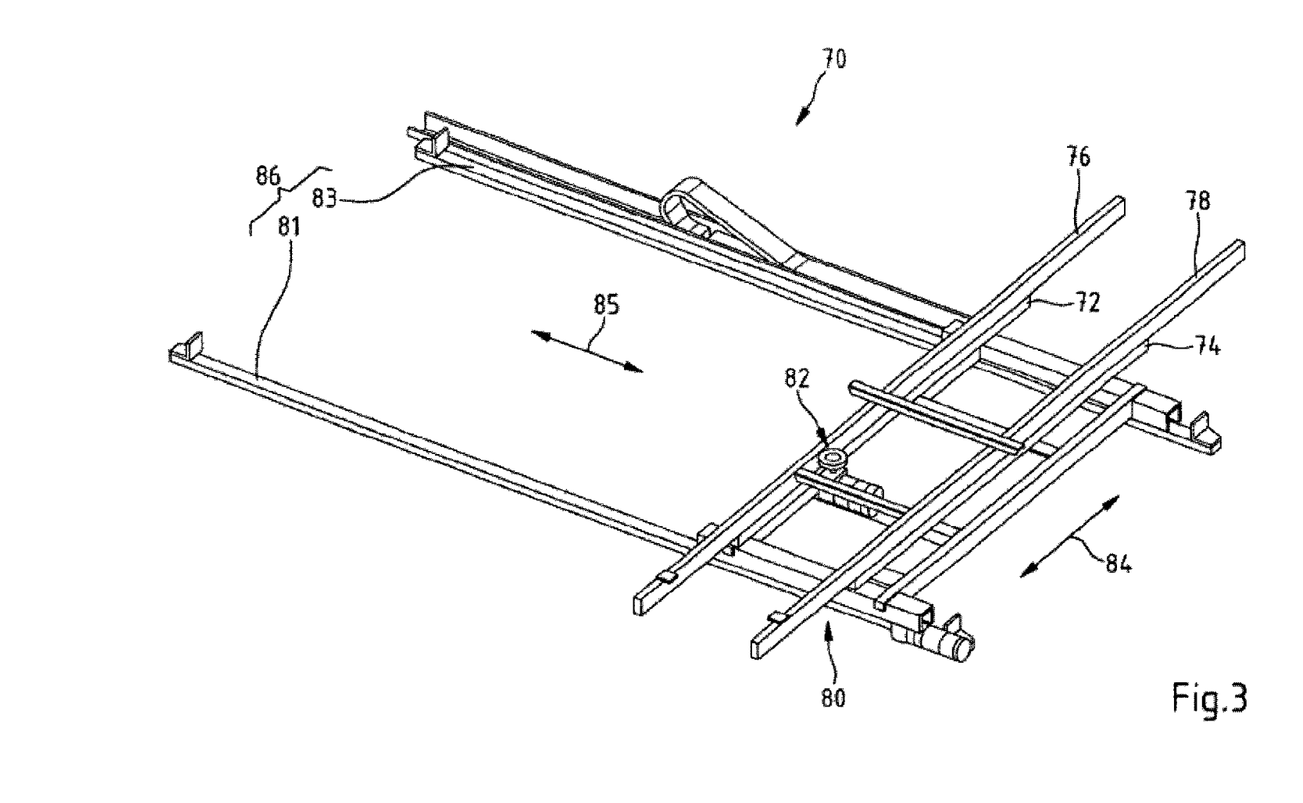
FIG. 3 shows a second conveying apparatus for a transport unit designed as a skid.

The conveying apparatus 70 in FIG. 3 is configured as a conveying apparatus for moving a skid in a rotary dipping system. The conveying apparatus 70 includes a support 72 and a support 74 for the runners (76, 78) of a skid 80. The runners (76, 78) of the skid 80 are guided movably on the support (72, 74) by a driving unit 82 having a drive roller, in a manner corresponding to the double arrow 84. The driving unit 82 is fastened to the support 72. The configuration of the driving unit 82 corresponds to that of the driving unit 11 described with reference to FIG. 2. The supports (72, 74) with the driving unit 82 are in turn accommodated on a linear movement unit 86. The linear movement unit 86 has a rail system with rails (81, 83). In the linear movement unit 86, the supports (72, 74) can be moved on the rails (81, 83) by means of a drag chain mechanism corresponding to the double arrow 85.

Figure 4:
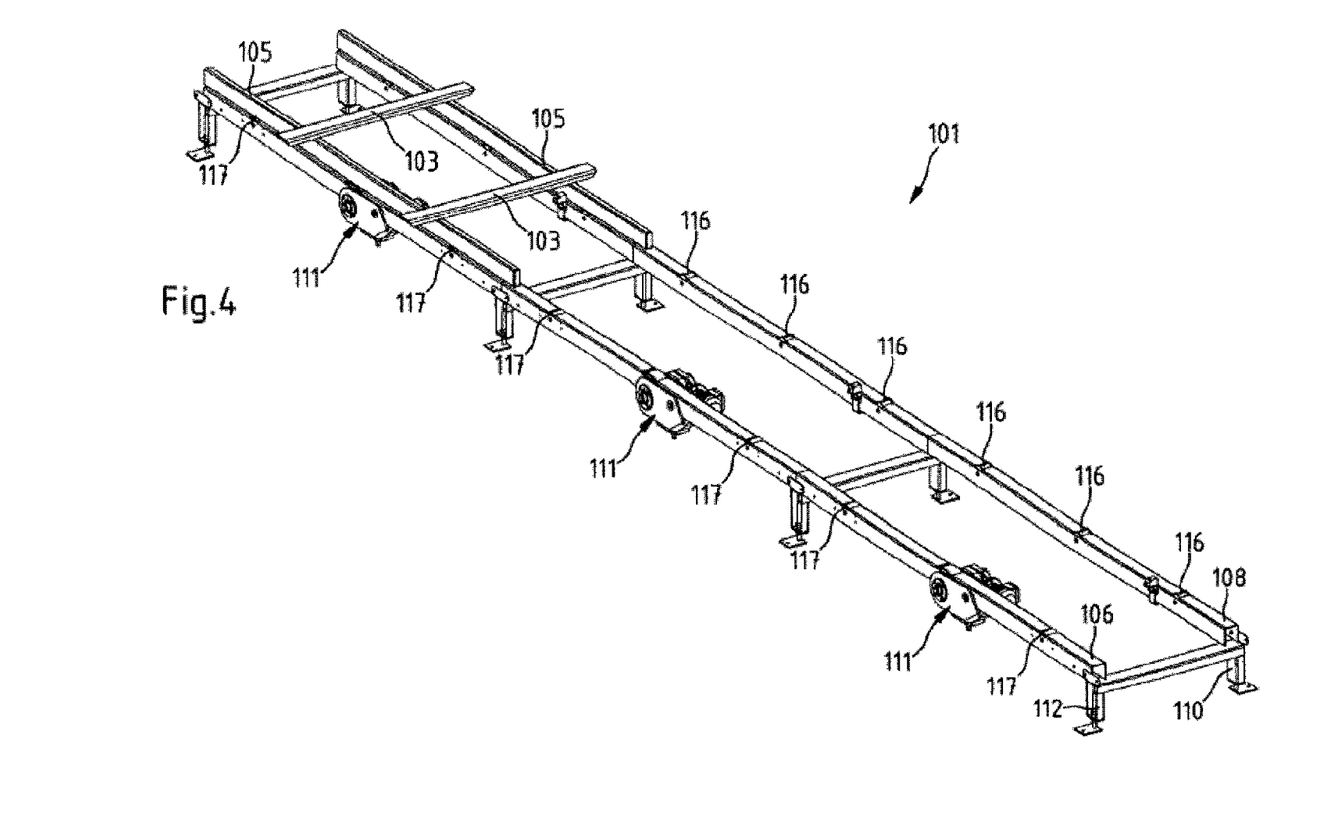
FIG. 4 shows a third conveying apparatus for a transport unit designed as skid; and, FIG. 5 shows a detailed view of the third conveying apparatus with a drive roller.

The conveying apparatus 101 in FIG. 4 has a support 106 and a support 108. The supports (106, 108) rest on posts (110, 112). For the movement of a skid 103, the conveying apparatus 101 has driving units 111. The runner 105 of the skid 103 is guided on the support 108 on supporting rollers 116. On the support 106 there are supporting rollers 117 which take up the weight of the runner 105 of the skid 103.

Figure 5:
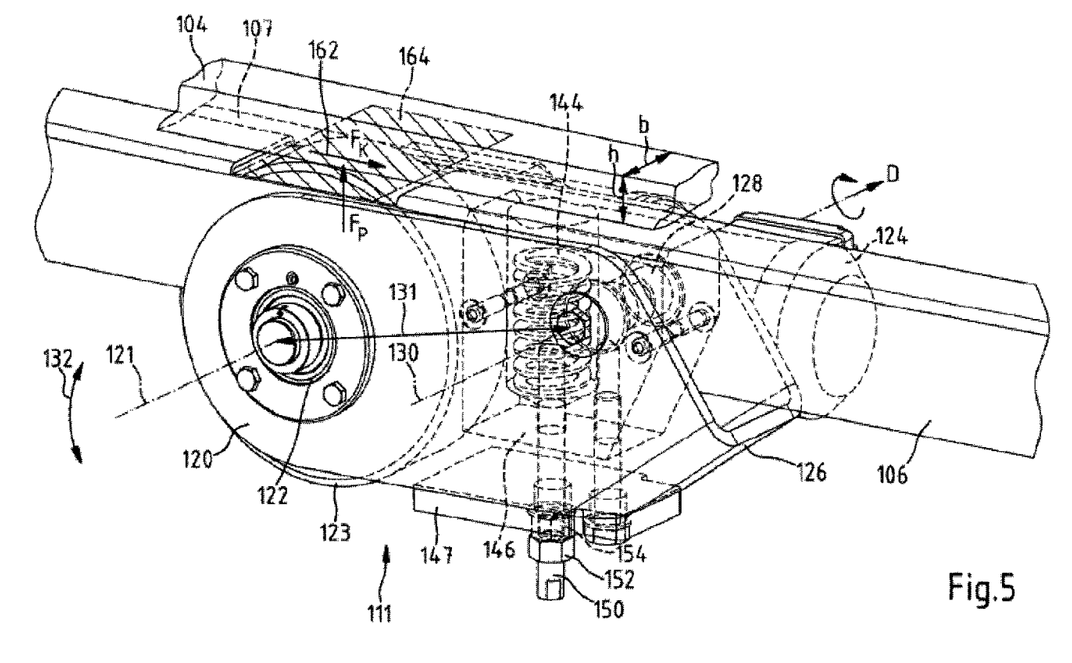

FIG. 5 shows a section of the conveying apparatus 101 according to FIG. 4 with a driving unit 111. The driving unit 111 includes a drive roller 120 which is mounted rotatably in a rotary bearing 122 having an axis of rotation 121. The drive roller 120 has a running surface 123 made of an elastomeric plastic (in particular a PUR). The drive roller 120 is assigned an electric motor 124 as the drive. The electric motor 124 and the drive roller 120 are accommodated on a pivotable holding unit 126. The pivotable holding unit 126 is held in a rotary joint 128 on the support 106. The holding unit 126 can be pivoted about the axis 130 in the rotary joint 128. A pivotable effective lever arm 131 for the rotary bearing 122 with the drive roller 120 is formed by means of the holding unit 126. The drive roller 120 can thus be moved about the axis 130 relative to the support 106 in a manner corresponding to the double arrow 132.

The lever arm 131 is subjected to force by means of a spring unit 144 supported on the holding unit 126. The spring unit 144 is fixed to the support 106 in a spring receptacle 146. The spring unit 144 is accommodated in the adjustment section 147 on the holding unit 126. In order to adjust the spring unit 144, there is an adjusting screw 150 with a threaded nut 152 and a thread 154 there as the adjustment device.

The drive roller 120 bears against the lower side 107 of the runner 104. In this case, the drive roller is subjected to a press-on force $F_P$ via the spring unit 144, which generates a torque D in the pivot axis 130 of the holding unit 126. The press-on force $F_P$ can be adjusted independently of the weight of the skid 103 that is introduced into the support 106 via the runner 104 by adjustment of the adjusting screw 150. By means of the drive roller 120, a conveying force $F_K$ can thus be introduced into the runner 104 of the skid 103 in the direction of the arrow 162. The horizontal aligned plane 164 is set up by means of the perpendicular projection of the pivot axis 130 of the lever arm 131 and the conveying direction 162.

In summary, the following preferred features of an apparatus according to the invention should be emphasized: the conveying apparatus 1 is configured for moving a transport unit 3 which has at least one running section (4, 5). The running section (4, 5) can, in particular, be configured as a runner of a skid. The conveying apparatus 1 has a support (6, 8) which takes up the weight of the transport unit 3 on the running section (4, 5). The conveying apparatus 1 includes at least one drive roller 20 which is designed for a rolling movement on the running section (4, 5) of the transport unit 3 and subjects the transport unit 3 to a force $F_K$ for movement along the support (6, 8). The drive roller 20 is operatively connected to a force-generating means 44 for providing a press-on force $F_P$ pressing the drive roller 20 against the running section (4, 5) of the transport unit 3.

It is understood that the foregoing description is that of the preferred embodiments of the invention and that various changes and modifications may be made thereto without departing from the spirit and scope of the invention as defined in the appended claims.

What is claimed is:

1. A conveying apparatus comprising:
    a transport unit having a running section defining a lateral surface;
    a support for supporting said transport unit so as to receive the weight of said transport unit passing through said running section;

drive assembly for moving said transport unit along said support in a conveying direction;

said drive assembly including a drive roller for interacting with said running section to impart a conveying force ($F_K$) thereto to move said transport unit along said support;

said drive assembly further including a force-generating device operatively connected to said drive roller to generate a press-on force ($F_p$) for pressing said drive roller against said running section of said transport unit;

said drive roller defining a rotational axis displaceable relative to said support;

a lever arm pivotably movable about a pivot axis;

said drive roller being rotatably mounted on said lever arm and said lever arm being chargeable by said force-generating device to generate said press-on force ($F_p$);

a perpendicular projection of said lever arm to said conveying direction and said pivot axis conjointly defining a vertically directed plane; and, said force-generating device being arranged so as to cause said press-on force ($F_p$) to be applied by said drive roller to said lateral surface of said running section through which said weight of said transport unit passes into said support.

2. The conveying apparatus of claim 1, wherein said lateral surface is a first lateral surface and said running section defines a second lateral surface lying opposite to said first lateral surface; said force-generating device includes: a running roller arranged on said lever arm for generating said press-on force ($F_p$) and said running roller is configured to roll on said second lateral surface; and, a resilient biasing element for resiliently biasing said running roller against said second lateral surface.

3. The conveying apparatus of claim 2, wherein said force-generating device includes an adjusting device for definitively adjusting said press-on force ($F_p$) for said drive roller.

4. The conveying apparatus of claim 3 wherein, said drive assembly further includes a drive unit having a motor assigned to said drive roller; and, said drive unit is displaceable with said rotational axis of said drive roller.

5. The conveying apparatus of claim 1, wherein one or several rotatably mounted support rollers are arranged on said support for receiving said running section thereon.

6. The conveying apparatus of claim 5, wherein said support rollers are configured as flanged rollers.

7. The conveying apparatus of claim 5, wherein said running section of said transport unit is a first running section; said transport unit has a second running section; said support is a first support and said conveying apparatus comprises a second support; said first and second supports take up the weight of said transport unit at corresponding ones of said first and second running sections; wherein said drive assembly is a first drive assembly and said conveying apparatus comprises a plurality of said drive assemblies; each one of said drive assemblies includes a drive roller arranged on one of said first and second supports and said one drive roller has a rotational axis displaceable relative to said one support; and, said one of said drive assemblies also includes a force-generating device operatively connected to said drive roller to generate a press-on force ($F_p$) for pressing said drive roller against the running section corresponding to said one support.

8. The conveying apparatus of claim 1, further comprising position detectors mounted along said support for detecting the position of said transport unit.

9. The conveying apparatus of claim 1, wherein said support is accommodated on a linear movement unit for moving the transport unit in a further conveying direction.

10. The conveying apparatus of claim 1, wherein said lateral surface of said running section is a first lateral surface facing toward said support and said running section defines a second lateral surface facing away from said support; and, wherein said drive assembly is a first drive assembly and said conveying apparatus comprises a second drive assembly for moving said transport unit along said support in said conveying direction; said second drive assembly includes a drive roller for interacting with said running section of said transport unit to impart a conveying force ($F_K$) thereto to move said transport along said support;

said second drive assembly further includes a force-generating device operatively connected to said drive roller of said second drive assembly to generate a press-on force ($F_p$) for pressing said drive roller of said second drive assembly against said running section of said transport unit;

said drive roller of said second drive assembly defines a rotational axis displaceable relative to said support;

said second drive assembly also includes a lever arm pivotally moveable about a pivot axis;

said drive roller of said second drive assembly is rotatably mounted on said lever arm of said second drive assembly and said lever arm of said second drive assembly is chargeable by said force-generating device of said second drive assembly;

a perpendicular projection of said pivot axis of said lever arm of said second drive assembly to said conveying direction and said conveying direction conjointly define a horizontally directed plane or a plane inclined about said pivot axis of said lever arm of said second drive assembly with respect to a horizontal plane; and, said force-generating device of said second drive assembly is so arranged so as to cause said press-on force (Fp) of said drive roller of said second drive assembly to be applied by said drive roller of said second drive assembly to one of said first and second lateral surfaces of said running section.

11. The conveying apparatus of claim 10, wherein said force-generating device of said second drive assembly includes resilient biasing means for generating said press-on force ($F_p$); and, said resilient biasing means is supported on said support and is fastened to said lever arm of said second drive assembly.

12. The conveying apparatus of claim 11, wherein said resilient biasing means is a spring.

13. The conveying apparatus of claim 1, wherein said transport unit is a skid and said running section is a runner of said skid.

14. A conveying apparatus comprising:

a transport unit having a running section defining a lateral surface;

a support for supporting said transport unit so as to receive the weight of said transport unit passing through said running section;

a drive assembly for moving said transport unit along said support in a conveying direction;

said drive assembly including a drive roller for interacting with said running section to impart a conveying force ($F_K$) thereto to move said transport unit along said support;

said drive assembly further including a force-generating device operatively connected to said drive roller to generate a press-on force ($F_p$) for pressing said drive roller against said running section of said transport unit;

said drive roller defining a rotational axis displaceable relative to said support;

a primary lever arm pivotably movable about a pivot axis;
said drive roller being rotatably mounted on said primary lever arm and said primary lever arm being chargeable by said force-generating device to generate said press-on force ($F_p$);
a perpendicular projection of said primary lever arm to said conveying direction and said pivot axis conjointly defining a vertically directed plane;
said force-generating device being arranged so as to cause said press-on force ($F_p$) to be applied by said drive roller to said lateral surface of said running section through which said weight of said transport unit passes into said support;
said lateral surface being a first lateral surface and said running section defining a second lateral surface lying opposite to said first lateral surface;
said force-generating device including a secondary lever arm pivotally mounted so as to also pivot about said pivot axis and be pivotally movable with respect to said primary lever arm;
a running roller arranged on said secondary lever arm for generating said press-on force ($F_p$) and said running roller being configured to roll on said second lateral surface; and,
a resilient biasing unit for resiliently biasing said running roller so as to cause said running roller to pivot with said secondary lever arm about said pivot axis and press against said second lateral surface thereby generating said press-on force ($F_p$).

15. A conveying apparatus comprising:
a transport unit having at running section defining a lateral surface;
a support for supporting said transport unit so as to receive the weight of said transport unit passing through said running section;
said support and said running section conjointly defining an interface;
a plurality of rotatably mounted support rollers disposed at said interface to facilitate a movement of said transport unit along said support and for transmitting said weight directly from said running section into said support;
a drive assembly for moving said transport unit along said support in a conveying direction;
said drive assembly including a drive roller for interacting with said running section to impart a conveying force ($F_K$) thereto to move said transport unit along said support;
said drive assembly further including a force-generating device operatively connected to said drive roller to generate a press-on force ($F_p$) for pressing said drive roller against said running section of said transport unit;
said drive roller defining a rotational axis displaceable relative to said support;
a lever arm pivotably movable about a pivot axis;
said drive roller rotatably mounted on said lever arm and said lever arm being chargeable by said force-generating device to generate said press-on force ($F_p$);
a perpendicular projection of said lever arm to said conveying direction and said pivot axis conjointly defining a vertically directed plane; and,
said force-generating device being arranged so as to cause said press-on force ($F_p$) to be applied by said drive roller to said lateral surface of said running section through which said weight of said transport unit passes via said support rollers into said support.

16. The conveying apparatus of claim 15, wherein said support rollers are rotatably mounted on said support in spaced relationship to each other.

* * * * *